No. 749,097. PATENTED JAN. 5, 1904.
B. REPSDORPH & W. H. BURTON.
CAR SEAT.
APPLICATION FILED SEPT. 29, 1903.
NO MODEL. 2 SHEETS—SHEET 1.
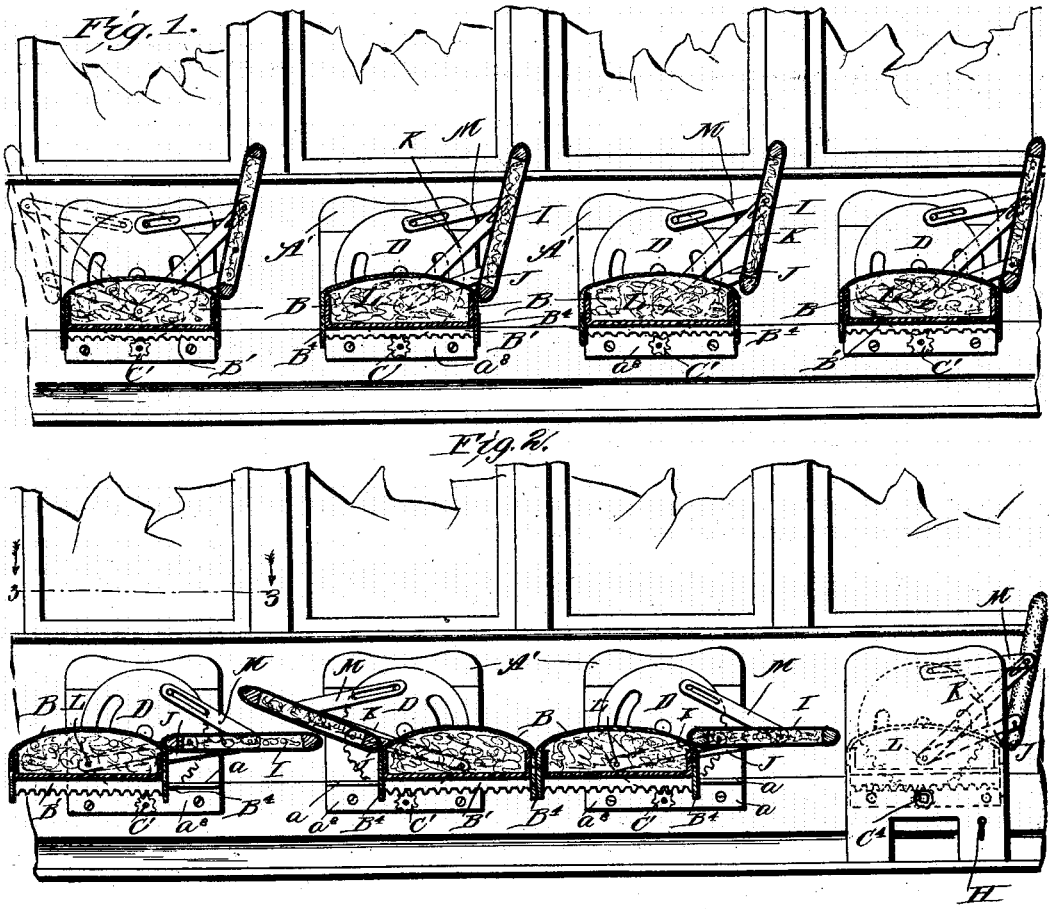
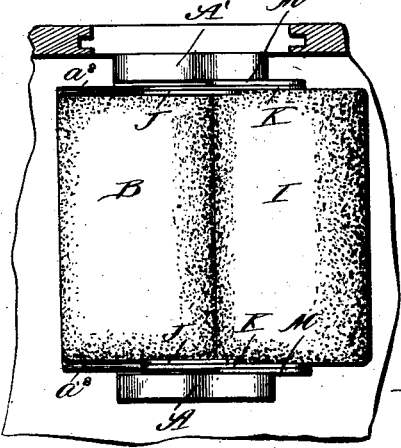

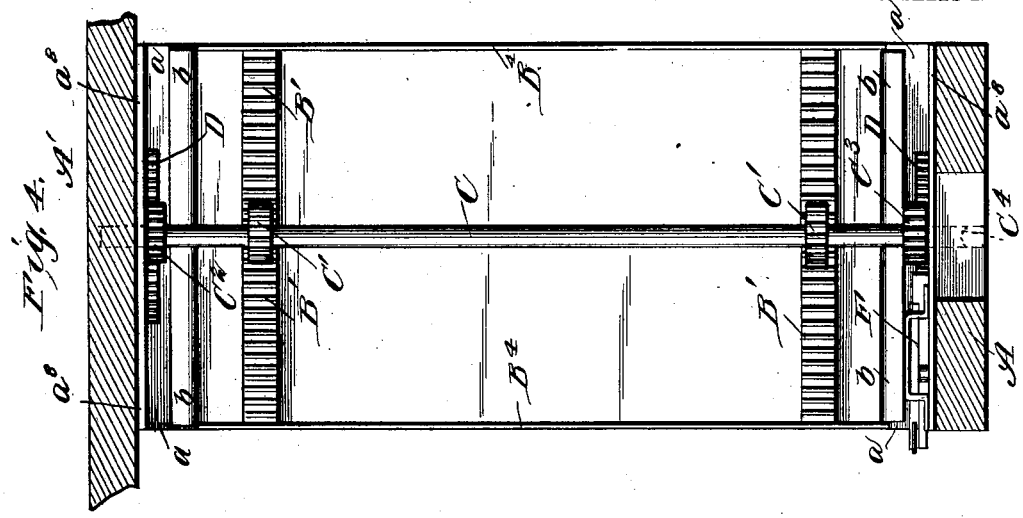
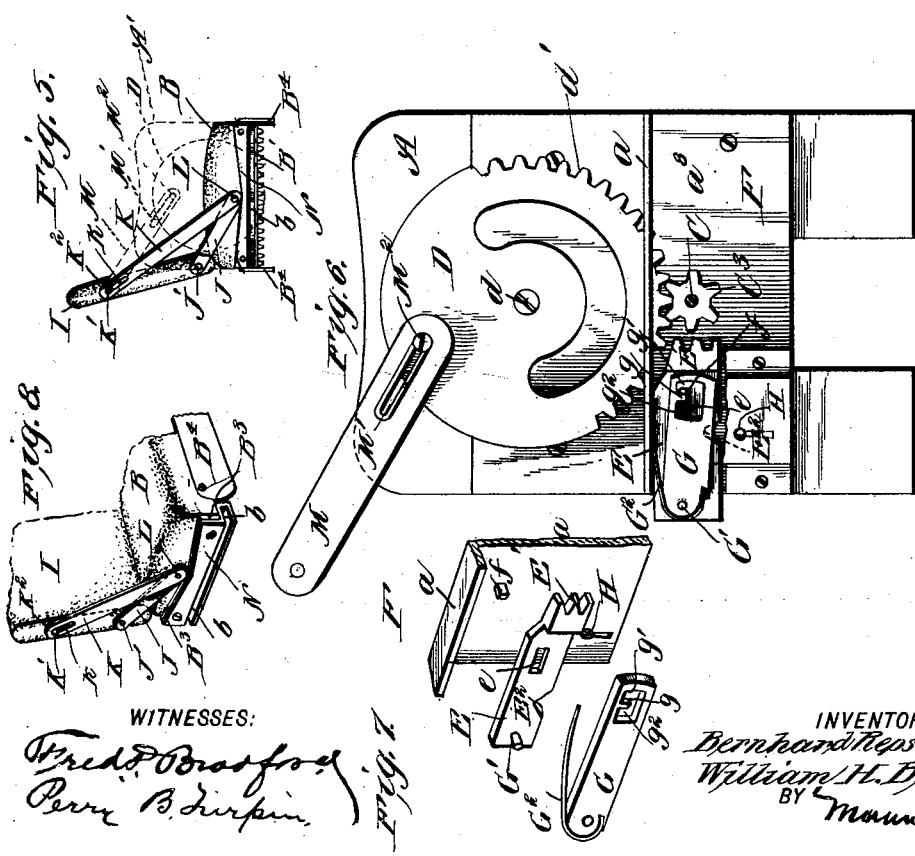
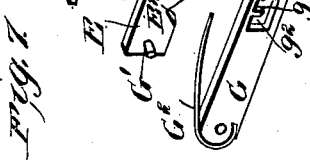

No. 749,097. Patented January 5, 1904.

UNITED STATES PATENT OFFICE.

BERNHARD REPSDORPH AND WILLIAM HENRY BURTON, OF HOUSTON, TEXAS.

CAR-SEAT.

SPECIFICATION forming part of Letters Patent No. 749,097, dated January 5, 1904.

Application filed September 29, 1903. Serial No. 175,046. (No model.)

*To all whom it may concern:*

Be it known that we, BERNHARD REPSDORPH and WILLIAM HENRY BURTON, citizens of the United States, and residents of Houston, in the county of Harris and State of Texas, have made certain new and useful Improvements in Car-Seats, of which the following is a specification.

This invention is an improvement in car-seats, being especially intended to provide a novel construction whereby the seats and the backs thereof may be adjusted to form a bed for use when desired; and the invention consists in certain novel contructions and combinations of parts, as will be hereinafter described and claimed.

In the drawings, Figure 1 is a sectional elevation of a portion of a car embodying our invention with the seats adjusted for use as ordinary car-seats. Fig. 2 is a similar view showing the seats and their backs adjusted to form a bed or couch upon which the passengers may recline. Fig. 3 is a detail sectional plan view on about line 3 3 of Fig. 2. Fig. 4 is a bottom plan view of one of the seats. Fig. 5 is a detail side view of one of the seats. Fig. 6 is a detail elevation of one of the side frames and the parts moving thereon. Fig. 7 illustrates in detail perspective the lock for holding the seat from movement; and Fig. 8 is a detail perspective view of a portion of the seat, taken from one corner thereof.

By our invention we provide for shifting the seats in the direction of length of the car and for adjustment of the backs of the two adjacent seats, so such seats and their backs may form a couch or bed upon which the passengers may recline, as will be best understood from Fig. 2.

In carrying out the invention we provide two end frames for the seats, one of said end frames, A, being shown in Fig. 6. This frame A (shown in Fig. 6) is one of those next the aisle, the opposite end frame, A', and the parts connected therewith being similar to the frame A and its connected parts except that the frame A is provided with a locking device (shown in Fig. 6 and in detail in Fig. 7) for securing the operating-shaft from movement, and thereby locking the seat in its different positions. These end frames A and A' are provided on their inner sides with ribs or flanges $a$, which enter grooves $b$ in the ends of the seats B and guide the said seats in their movements back and forth and also support the seats, as will be understood from Figs. 2, 3, 5, and 6.

The operating-shaft C extends between the end frames A and A' and journals therein and is provided with pinions C', meshing with racks B' on the seat, and also with pinions $C^2$ and $C^3$, which mesh with the rockers D at the opposite ends of the seats. The pinion $C^3$ is also arranged to be meshed by the toothed end E' of the bolt E of the locking mechanism, such mechanism including a case F, having a pin $f$ entering a slot $e$ in the bolt E and also entering an opening $g$ in the tumbler G of such locking mechanism. This opening $g$ has the two notches $g'$ and $g^2$, which are occupied by the projection $f$, respectively, when the bolt is in unlocked and locked position. The bolt E and the tumbler F are pivoted together at G', and a spring $G^2$ normally holds the tumbler in the position shown in Fig. 6, and yet permits its movement upward by the operation of a suitable key inserted through the keyhole H to such an extent as to release the tumbler from engagement with the projection $f$, so the key may by engaging in the notch $E^2$ of the bolt E throw the bolt and the tumbler to a position where the bolt will engage at E' with the pinion $C^3$, and thus lock the shaft C from turning and as said shaft is geared at C' with the seat also lock the seat from movement. When the bolt is thrown to the position shown in Fig. 6, the pinion $C^3$ will be released, and the operating-shaft may be turned to throw the seat to any of the positions shown in Fig. 2 by the proper turning of the shaft C.

The backs I are each carried on two links J and K, which are pivoted at L to the seats at the opposite ends thereof and connect at J' and at K' with the backs near the opposite edges of the latter. The connection between the links K and the backs is effected by means of pins $K^2$, passing through slots $k$, elongated in the direction of length of the links, so the seat-back can play on its connection with the link K in adjusting such back to the different positions to which it is desired to set the said back. The rockers D, pivoted at $d$ and having teeth $d'$ meshing with the pinions $C^2$ and $C^3$, are also connected by the links M with the seat-backs, such links M connecting with the seat-back at the same point with the longer links K, which connect such back with the seat proper. The links M have a sliding connection with the rockers D, effected by slotting the links at $M'$ and passing a pin or screw $M^2$ through said slot into the rocker, so the rocker may positively operate the links M when in certain positions and the said links may at the same time move longitudinally to a limited extent independent of the rocker D. By preference we provide these rockers and also links M at both ends of the seat-back. This rocker D operates to move the back from the position shown at the left in Fig. 2 to that shown at the right in the said figure, and it will be seen that in so doing the shaft C is turned in the proper direction to readjust the seat proper to the position shown in Fig. 1, and such movement of the shaft will turn the rocker, so that the latter by means of its links M will be pulled up to the position shown at the right in Fig. 2 and also shown in Fig. 1, and in so doing the links K and J will readjust to the proper position to support the back, the latter being moved manually from time to time as may be required in the operations to set it to the desired angle to suit the passenger.

In operation we supply to the trainmen a key for operating the lock mechanism and also a wrench for application to the squared head $C^4$ of the shaft C, so the seats may be unlocked and then adjusted to the desired position and locked in such position, the latter being under the control of the trainmen at all times. When the back is in position for use, as shown in Figs. 1 and 5, the link M operates to brace it in position. The link K supports the back when the latter is lowered to the position shown at the left in Fig. 2, and at such time the said link K rests upon lateral lugs or shoulders $B^3$ at the ends of the seat, as best shown in Fig. 5. These lugs $B^3$ are secured to the plates N, which latter are secured to the ends of the seat and rest upon the flange $a$, which is the horizontal wing of a right-angular plate whose vertical wing $a^8$ is secured to the frame A or A', the flange $a$ being slotted to permit the passage of the rocker or wheel D, as shown. The seats are also provided at their opposite edges with the depending plates $B^4$ at the ends of the racks B', which plates abut the pinions C' and prevent the seat proper from being moved too far in either direction.

The backs are upholstered alike on both sides, and one back will operate as a pillow for the passenger when the parts are adjusted as shown in Fig. 2.

Having thus described our invention, what we claim as new, and desire to secure by Letters Patent, is—

1. The combination substantially as herein described, of the car-seats provided with racks, the frames having pinions engaging with said racks, the seat-backs, the rockers having links connected with the seat-backs, said rockers being provided with gear-teeth, pinions on the operating-shaft meshing with the gear-teeth of the rockers, links connecting the backs with the seats proper, and locking devices having bolts for engagement with the pinions of the operating-shaft, whereby to lock the said shaft and thereby the seats in any desired adjustment, substantially as set forth.

2. In a car-seat adapted for adjustment to form a portion of a couch for reclining purposes, the combination of the movable seat proper, the framing in which said seat proper is movable, the rockers jointed to the framing and provided with teeth, racks on the seat proper, the back, connections between the rocker and the back, connections between the seat proper and the back, and the operating-shaft geared with the rockers and with the racks of the seat proper, substantially as set forth.

3. The combination with the seat proper and the back, of the operating-shaft, means whereby the operating-shaft may adjust the seat proper, and a key-operated locking device for the operating-shaft, substantially as set forth.

4. The combination with the seat proper, and the back, of the operating-shaft geared with the seat proper, a rocker geared with the operating-shaft, and the back connected with the rocker, substantially as set forth.

5. The combination with the framing, and the seat proper, having racks extending transversely across its under side, of depending stop-plates at its opposite edges projecting below the said racks, and the operating-shaft having pinions meshing with the racks of the seat proper, substantially as set forth.

6. The combination of the series of adjacent seats having seats proper arranged for adjustment into contact with each other to form portions of a couch, the backs of said seats being adjustable to a position to form end extensions of the couch, and gear for operating said seats and back, substantially as set forth.

7. The combination of the operating-shaft, the movable seat proper geared with the operating-shaft, the back, the links J and K connecting the back and seat, the rocker geared with the operating-shaft, and the link connecting the rocker with the seat-back, substantially as set forth.

8. The combination of the framing, the seat proper having rack devices, the back, the rocker having rack-teeth, connections between the rocker and the back, the operating-shaft geared with the rack devices of the rocker and seat proper, and the lock having a bolt engaging with and locking the operating-shaft, substantially as set forth.

9. The combination of the framing, the seat proper, the back, links J and K connecting the back and seat proper, the lugs on the ends of the seat for supporting said links K when the back is adjusted to a reclining position, guides on the framing for supporting the seat proper, and means for operating the seat proper, substantially as set forth.

10. The combination of the end frames, the rockers pivoted thereto and having the rack-teeth, the guide-flanges on the said end rails, the operating-shaft journaled to said end frames and having pinions meshing with the rockers, the lock devices supported on one of the end frames, and engaging with the operating-shaft, the seat proper sliding on the guide-flanges of the end frames, and having racks meshed with the operating-shaft, the back, links connecting the back with the rockers and links connecting the back with the seat proper, substantially as and for the purposes set forth.

BERNHARD REPSDORPH.
WILLIAM HENRY BURTON.

Witnesses:
  H. B. RICE,
  H. H. LUMMIS.